United States Patent [19]
Murphy et al.

[11] Patent Number: 6,042,355
[45] Date of Patent: Mar. 28, 2000

[54] MOLD FOR USE IN A GAS-ASSISTED INJECTION MOLDING SYSTEM AND EJECTOR PIN SUBSYSTEM INCLUDING A SPLIT PIN FOR USE THEREIN

[75] Inventors: John F. Murphy, Imlay City; Randolph S. Porter, Grand Blanc, both of Mich.

[73] Assignee: Larry J. Winget, Leonard, Mich.

[21] Appl. No.: 09/059,947

[22] Filed: Apr. 14, 1998

[51] Int. Cl.[7] .................................................. B29C 45/42
[52] U.S. Cl. ..................... 425/130; 264/572; 425/444; 425/546; 425/556; 425/806; 425/812
[58] Field of Search ........................... 264/572; 425/130, 425/444, 546, 556, 557, 806, 812

[56] References Cited

U.S. PATENT DOCUMENTS

| 4,734,027 | 3/1988 | Adams | 425/556 |
|---|---|---|---|
| 4,820,149 | 4/1989 | Hatakeyama et al. | 425/556 |
| 5,090,886 | 2/1992 | Jaroschek | 425/130 |
| 5,098,637 | 3/1992 | Hendry | 264/572 |
| 5,423,667 | 6/1995 | Jaroschek | 425/130 |
| 5,484,278 | 1/1996 | Berdan | 425/444 |
| 5,607,640 | 3/1997 | Hendry | 264/572 |

FOREIGN PATENT DOCUMENTS

| 0 393 315 | 10/1990 | European Pat. Off. . | |
|---|---|---|---|
| 2315905 | 10/1974 | Germany | 425/444 |
| 56-169047 | 12/1981 | Japan | 425/556 |
| 2-164509 | 6/1990 | Japan | 425/556 |
| 4-47915 | 2/1992 | Japan | 425/556 |
| 476173 | 11/1975 | U.S.S.R. | 425/556 |
| 1705107 | 1/1992 | U.S.S.R. | 425/556 |
| 2260932 | 5/1993 | United Kingdom | 264/572 |

*Primary Examiner*—Robert Davis
*Attorney, Agent, or Firm*—Brooks & Kushman P.C.

[57] ABSTRACT

A mold for use in a gas-assisted injection molding system includes an ejector pin subsystem including a split pin which partially blocks the flow of molten plastic through a secondary runner, helps to eject solid plastic from the mold, and helps to define an article-defining cavity and the secondary runner in the mold. A first spill cavity is flow coupled by the secondary runner to the article-defining cavity. The split pin together with other ejector pins are mounted on an ejector plate to move therewith between extended and retracted positions. A second spill cavity is flow coupled by a tertiary runner to the first spill cavity if needed. The split pin, as well as the other ejector pins mounted on the ejector plate, eject plastic from the article-defining cavity, the spill cavities, and the secondary and tertiary runners in the extended position of the ejector plate.

11 Claims, 1 Drawing Sheet

MOLD FOR USE IN A GAS-ASSISTED INJECTION MOLDING SYSTEM AND EJECTOR PIN SUBSYSTEM INCLUDING A SPLIT PIN FOR USE THEREIN

CROSS-REFERENCE TO RELATED APPLICATIONS

This application is related to U.S. patent applications entitled "Mold For Use In A Gas-Assisted Injection Molding System And Gas Pin Assembly For Use Therein" filed Sep. 22, 1997 and having U.S. Ser. No. 08/935,013; "Mold For Use In A Gas-Assisted Injection Molding System And Adjustable Overflow Pin Assembly Use Therein" now U.S. Pat. No. 5,869,105; "Mold For Use In A Gas-Assisted Injection Molding System And Ejector Pin Subsystem Including A Blocking Pin Assembly For Use Therein" filed on Apr. 14, 1998 and having U.S. Ser. No. 09/060,239; and "Mold For Use In A Plastic Injection Molding system And Venting Pin Assembly For Use Therein" filed on Mar. 12, 1998 and having U.S. Ser. No. 09/041,333.

TECHNICAL FIELD

This invention relates to molds and ejector pin subsystems for use therein and, in particular, to molds for use in gas-assisted injection molding systems and ejector pin subsystems including split pins for use therein.

BACKGROUND ART

U.S. Pat. No. 5,098,637 discloses a method and system for injection molding hollow plastic articles with pressurized gas which provides for displacement by the gas of a portion of plastic from the mold cavity into a flow-coupled spill cavity. The volume of the spill cavity may be varied to control the quantity of displaced plastic such as by a lead screw.

U.S. Pat. No. 5,607,640 (i.e. '640 patent) discloses in FIGS. 1–4 thereof, the use of a spill cavity with a blocking pin and shims to control the volume of plastic going into the spill cavity. The pin is in its up position to block plastic flow from the article-defining cavity, through a runner and into the spill cavity. Subsequently, the pin moves to its down position to allow plastic to go to the spill cavity by pressurized gas. In the remainder of the '640 patent, a method and system are disclosed where the volume of the spill cavity is allowed to increase in a controlled fashion to a final volume based on the amount of plastic injected into the mold cavity. The volume of the spill cavity increases during a step of displacing the plastic into the spill cavity. In this way, the method and system eliminate the need for a shut-off or blocking pin. In two disclosed embodiments, pistons are utilized to purge or displace plastic from the spill cavity.

European Patent Document No. 393,315 discloses a spill subgate with a blocking hydraulic pin.

SUMMARY OF THE INVENTION

An object of the present invention is to provide a mold for use in a gas-assisted injection molding system and ejector pin subsystem for use therein wherein the subsystem includes an ejector plate and a split pin mounted thereon which allows plastic to flow from an article-defining cavity, through a secondary runner, in which the split pin is located, and into a spill cavity to easily confirm (such as visually) that gas has traveled through the resulting hollow part without additional tooling/function/cost.

Another object of the present invention is to provide a mold for use in a gas-assisted injection molding system and ejector pin subsystem for use therein wherein the subsystem includes an ejector plate and a split pin mounted on the ejector plate to move therewith and wherein the split pin is slidably fit within the mold to not only partially block the flow of molten plastic within a secondary runner in the mold but also to cooperate with the rest of the subsystem to eject solidified plastic from an article-defining cavity, a spill cavity and the secondary runner. This is a practical design which is not only relatively inexpensive but also is simple in operation and for servicing.

In carrying out the above object and other objects of the present invention, a mold for use in a gas-assisted injection molding system is provided. The mold includes a first mold half and a second mold half. The first and second mold halves are movable relative to each other between an open position and a closed position. The first and second mold halves define an article-defining cavity, at least one spill cavity, and a secondary runner for flow coupling the spill cavity to the article-defining cavity. The mold also includes an ejector pin subsystem including an ejector plate supported to move relative to the second mold half between extended and retracted positions and a split pin mounted on the ejector plate to move therewith. The split pin is slidably fit within the second mold half to partially block the flow of molten plastic through the secondary runner and to partially allow the flow of molten plastic through the secondary runner and into the at least one spill cavity in the retracted position of the ejector plate. The ejector pin subsystem also includes at least one ejector pin also mounted on the ejector plate and slidably fit within the second mold half to move with the ejector plate relative to the second mold half in an open position of the mold. The at least one ejector pin and the split pin eject plastic from the article-defining cavity, the at least one spill cavity, and the secondary runner in the extended position of the ejector plate.

Also, preferably, the split pin has an end surface which partially defines the article-defining cavity in the retracted position of the ejector plate.

Still, preferably, the split pin has a side surface which partially defines the secondary runner in the retracted position of the ejector plate.

Also, preferably, the at least one ejector pin moves within the at least one spill cavity to eject plastic from the at least one spill cavity and the secondary runner in the extended position of the ejector plate.

Still, preferably, the molten plastic flows in a first direction through the secondary runner to reach the at least one spill cavity and wherein the split pin moves in the secondary runner in a second direction substantially opposite the first direction during movement of the ejector plate from its retracted position to its extended position.

Still further in carrying out the above object and other objects of the present invention, in a mold having a first mold half and a second mold half wherein the first and second mold halves move relative to each other between an open position and a closed position and wherein the first and second mold halves define an article-defining cavity, at least one spill cavity, and a secondary runner for flow coupling the at least one spill cavity to the article-defining cavity, an ejector pin subsystem is provided. The ejector pin subsystem includes an ejector plate supported to move relative to the second mold half between extended and retracted positions thereof. The ejector pin subsystem also includes a split pin mounted on the ejector plate to move therewith. The split pin is slidably fit within the second mold half to partially block the flow of molten plastic through the secondary runner and to partially allow the flow of molten plastic through the secondary runner and into the at least one spill cavity in the retracted position of the ejector plate. The ejector pin subsystem further includes at least one ejector pin also mounted on the ejector plate and slidably fit within the second mold half to move with the ejector plate relative to the second mold half in the open position of the mold. The at least one ejector pin and the split pin eject plastic from the article-defining cavity, the at least one spill cavity, and the secondary runner in the extended position of the ejector plate.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
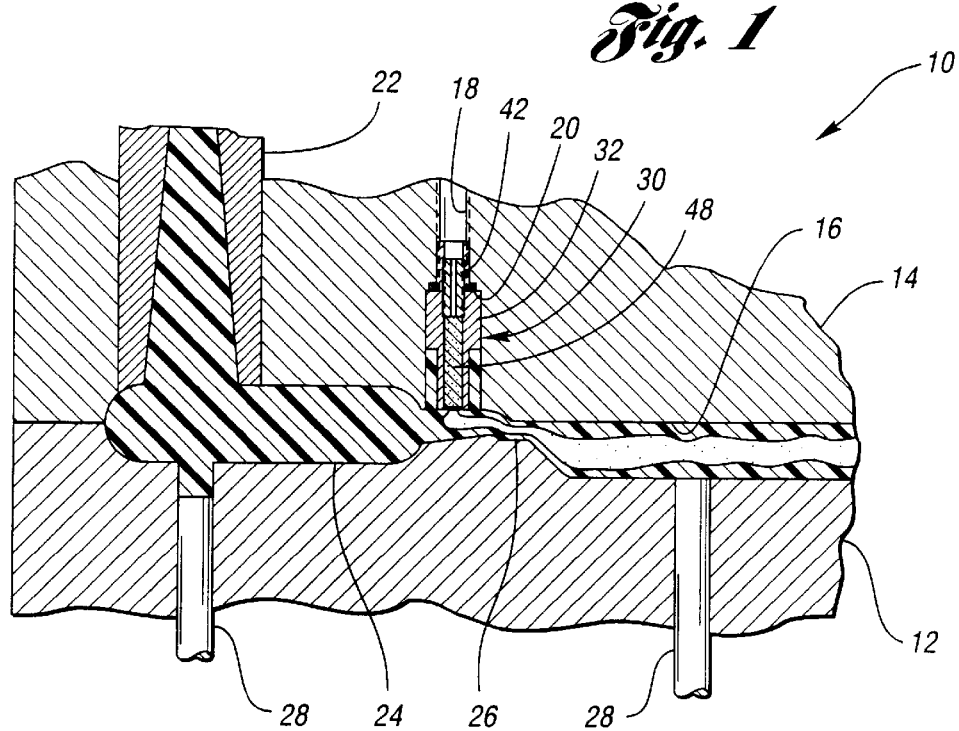
FIG. 1 is a view, partially broken away and in cross-section, of a mold in a gas-assisted injection molding system.

Referring now to the drawing Figures, there is illustrated in FIG. 1 a mold, generally indicated at 10, for use in a gas-assisted injection molding system. The mold 10 includes a first mold half 12 and a second mold half 14. The first and second mold halves 12 and 14, respectively, are movable relative to each other between an open position and a closed position as shown in FIG. 1, wherein the first and second mold halves 12 and 14 respectively define an article-defining cavity 16.

The second mold half 14 includes a gas passageway 18 which extends from an exterior surface (not shown) of the second mold half 14 to an inner interior surface 20 of the second mold half 14 in fluid communication with the article-defining cavity 16.

Figure 2:
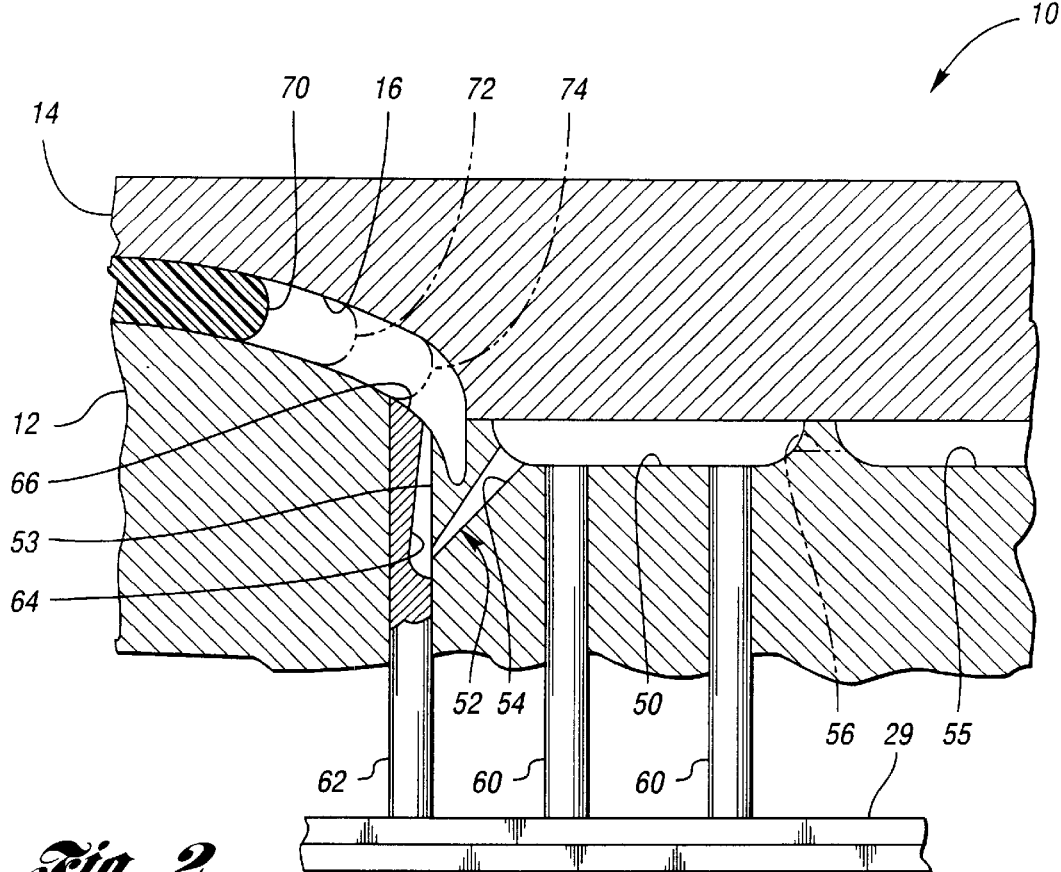
FIG. 2 is a view, partially broken away and in cross-section, of the mold and an ejector pin subsystem having a split pin all of which are constructed in accordance with the present invention.

The second or stationary mold half 14 includes a sprue 22 for communicating thermoplastic material to a runner 24 which, in turn, communicates with the article-defining cavity 16 via a gate 26. A thermoplastic flow path is defined by the sprue 22, the runner 24 and the gate 26. Ejector pins 28 extend through the first or movable mold half 12 and are connected to an ejector plate 29, as illustrated in FIG. 2. The ejector plate 29 is supported to move relative to the first mold half 12 from a retracted position to an extended position to eject a completed part from the article-defining cavity 16 as well as the plastic in the runner 24 and the sprue 22.

The mold 10 also includes a gas pin assembly, generally indicated at 30. The gas pin assembly 30 includes a one-piece housing 32. A base portion of the housing 32 is threadedly secured to the second mold half 14 at the interior surface 20 of the second mold half 14 so that the gas pin assembly 30 can be readily removed from the second mold half 14 in the open position of the mold 10. A rubber O-ring is typically provided about the base portion of the housing 32 to seal the housing 32 within the second mold half 14.

Preferably, the housing 32 also includes a hexagonal head portion so that the assembly 30 can be readily removed from the second mold half 14 in the open position of the mold 10 by a conventional tool (not shown).

The housing 32 includes an elongated aperture formed therein in communication with and aligned with the gas passageway 18 to permit the flow of gas therethrough.

The base portion of the housing 32 is also internally threaded to threadedly secure therein a holding device in the form of a set screw 42 which has a gas hole formed completely therethrough to permit the flow of gas therethrough.

The gas pin assembly 30 also includes a porous insert 48 comprising a sintered material such as aluminum, copper, nickel, steel, bronze, porcelain, and brass which permits the flow of gas therethrough but prevents the passage of molten plastic therethrough. The insert 48 is held in position within the aperture by the set screw 42 at one end thereof and by flanges of the head portion at the opposite end thereof.

The sintered material is preferably a bronze sintered material and can filter out foreign particles down to 20 microns. However, the micron size can be varied depending on the type of plastic utilized in the molding process.

Further details of the gas pin assembly 30 can be found within the above-noted patent application entitled "Mold For Use In A Gas-Assisted Injection Molding System And Gas Pin Assembly For Use Therein". While the gas pin assembly 30 is illustrated as the particular mechanism for injecting pressurized gas into the article-defining cavity 16, other mechanism can be utilized to inject pressurized gas into the article-defining cavity 16 as illustrated and described in the prior art patents noted in the "Background Art" portion of this application.

The mold 10 also includes a first spill cavity 50 and a secondary runner, generally indicated at 52, for flow coupling the spill cavity 50 to the article-defining cavity 16. The secondary runner 52 includes a vertically extending portion 53 and an angled portion 54. The mold also includes a second spill cavity 55 and a horizontally-extending tertiary runner which is typically machined in the mold half 12 if more space is needed to receive plastic displaced by pressurized gas from the cavity 16. Molten plastic flows from the article-defining cavity 16, through the secondary runner 52, to the spill cavity 50 through the tertiary runner 56 and to the spill cavity 55 upon the injection of pressurized gas into the article-defining cavity 16.

The mold 10 of the present invention also includes ejector pins 60 which slidably fit within the mold half 12 and are connected to the ejector plate 29 to move relative to the mold half 12 in an open position of the mold 10 upon movement of the ejector plate 29 relative to the mold half 12 between extended and retracted positions thereof. The pins 60 eject solidified plastic from the spill cavity 50 and the portion 54 of the secondary runner 52. Ejector pins (not shown) are also provided to eject solidified plastic from the spill cavity 54 and the tertiary runner 56.

The number of spill cavities such as spill cavities 50 and 54 is dependent upon how much molten plastic need be removed from the article-defining cavity 16 to define the desired hollow plastic part formed within the article-defining cavity 16.

The ejector pin subsystem mold 10 also includes a split pin 62 also mounted on the ejector plate 29 to move therewith. The split pin 62 is also slidably fit within the mold half 12 in the vertically extending portion 53 of the secondary runner 52 to partially block the flow of molten plastic through the secondary runner 52. A side surface 64 of the pin 62 partially defines the secondary runner 52 in the retracted position of the ejector plate 26 shown in FIG. 2.

The pin 62 is retractable within the portion 53 of the secondary runner 52 to the retracted position by movement of the ejector plate 29. In the retracted position of the split pin 62 within the portion 53 of the secondary runner 52, molten plastic is partially allowed to flow from the article-defining cavity 16 into the secondary runner 52 and then into the article-defining cavity 50. The split pin 62 has an end surface or face 66 which partially defines the article-defining cavity 16 in the retracted position of the ejector plate 29.

An injection molding cycle begins after the mold 10 is closed and the split pin 62 is retracted within the vertically extending portion 53 of the secondary runner 52 to partially block the secondary runner 52 as illustrated in FIG. 2.

The article-defining cavity 16 is then "short shot" with plastic to partially fill the article-defining cavity as indicated by plastic flow lines 70, 72 and 74 in FIG. 2. The front of the plastic reaches one of the positions indicated by lines 70, 72 or 74 after the "short-shot" plastic injection.

Then, pressurized gas is injected into the article-defining cavity 16 and the split pin 62 partially blocks some plastic from leaving the article-defining cavity 16. Excess plastic displaced by the pressurized gas within the article-defining cavity 16 travels through the secondary runner 52 and into the adjustable overflow or spill cavity 50 and into the spill cavity 54 if flow coupled thereto and if sufficient plastic has been "shot-shot" into the mold 10.

The molten plastic within the article-defining cavity 16, within the secondary and tertiary runners 52 and 56 and within the spill cavities 50 and 54 is allowed to cool and the pressurized gas is exhausted from the article-defining cavity 16. The mold 10 is then opened.

The ejector plate 29 which carries the pins 60,62 and the other ejector pins 28 is extended to eject plastic from the sprue 22 and runner 24, the plastic article from the article-defining cavity 16, plastic from the secondary and tertiary runners 52 and 56, and plastic from the overflow or spill cavities 50 and 54.

The plastic article is then typically inspected to confirm that gas has traveled through the resulting hollow part by seeing if the part has a gas exit hole formed through its lower surface adjacent the location supported by the end surface 66 of the split pin 62. Plastic for the resulting hollow part can be saved by ensuring that gas has traveled completely through the plastic part and has displaced the maximum amount of plastic from the article-defining cavity 16.

The ejector plate 29 is then retracted to move relative to the mold half 12 to the position shown in FIGS. 1 and 2 and the mold 10 is closed to await the beginning of another injection molding cycle.

While the best mode for carrying out the invention has been described in detail, those familiar with the art to which this invention relates will recognize various alternative designs and embodiments for practicing the invention as defined by the following claims.

What is claimed is:

1. A mold for use in a gas-assisted injection molding system, the mold comprising:
   a first mold half;
   a second mold half, the first and second mold halves being movable relative to each other between an open position and a closed position, wherein the first and second mold halves define an article-defining cavity, at least one spill cavity, and a secondary runner including a vertically extending portion and an angled portion for flow coupling the at least one spill cavity to the article-defining cavity the spill cavity being spaced from but flow coupled to the vertically extending portion by the angled portion; and
   an ejector pin subsystem including:
      an ejector plate supported to move relative to the second mold half between extended and retracted positions;
      a split pin mounted on the ejector plate to move therewith and slidably fit within the vertically extending portion in the second mold half to partially block the flow of molten plastic through the vertically extending portion of the secondary runner and to partially allow the flow of molten plastic through the vertically extending portion and into the angled portion of the secondary runner and into the at least one spill cavity in the retracted position of the ejector plate; and
      at least one ejector pin also mounted on the ejector plate and slidably fit within the second mold half to move with the ejector plate relative to the second mold half in the open position of the mold, the at least one ejector pin and the split pin ejecting plastic from the article-defining cavity, the at least one spill cavity, and the vertically extending and angled portions of the secondary runner in the extended position of the ejector plate.

2. The mold as claimed in claim 1 wherein the first and second mold halves define a pair of spill cavities in the mold.

3. The mold as claimed in claim 2 wherein the first and second mold halves define a tertiary runner for flow coupling the spill cavities.

4. The mold as claimed in claim 1 wherein the split pin has an end surface and wherein the end surface partially defines the article-defining cavity in the retracted position of the ejector plate in the closed position of the mold.

5. The mold as claimed in claim 1 wherein the split pin has a side surface and wherein the side surface partially defines the vertically extending portion of the secondary runner in the retracted position of the ejector plate in the closed position of the mold.

6. The mold as claimed in claim 1 wherein the molten plastic flows in a first direction through the vertically extending portion of the secondary runner to reach the at least one spill cavity and wherein the split pin moves in the vertically extending portion of the secondary runner in a second direction substantially opposite the first direction during movement of the ejector plate from its retracted position to its extended position.

7. In a mold having a first mold half and a second mold half, the first and second mold halves being movable relative to each other between an open position and a closed position and wherein the first and second mold halves define an article-defining cavity, at least one spill cavity, and a secondary runner including a vertically extending portion and an angled portion for flow coupling the at least one spill cavity to the article-defining cavity the spill cavity being spaced from but flow coupled to the vertically extending portion by the angled portion, an ejector pin subsystem comprising:
   an ejector plate supported to move relative to the second mold half between extended and retracted positions;
   a split pin mounted on the ejector plate to move therewith and slidably fit within the vertically extending portion in the second mold half to partially block the flow of molten plastic through the vertically extending portion of the secondary runner and to partially allow the flow of molten plastic through the vertically extending portion and into the angled portion of the secondary runner and into the at least one spill cavity in the retracted position of the ejector plate; and at least one ejector pin also mounted on the ejector plate and slidably fit within the second mold half to move with the ejector plate relative to the second mold half in the open position of the mold, the at least one ejector pin and the split pin ejecting plastic from the article-defining cavity, the at least one spill cavity, and the vertically extending and angled portions of the secondary runner in the extended position of the ejector plate.

8. The ejector pin subsystem of claim 7 wherein the split pin has a side surface and wherein the side surface partially defines the vertically extending portion of the secondary runner in the retracted position of the ejector plate in the closed position of the mold.

9. The ejector pin subsystem of claim 7 wherein the split pin has an end surface and wherein the end surface partially defines the article-defining cavity in the retracted position of the ejector plate in the closed position of the mold.

10. The ejector pin subsystem of claim 7 wherein the at least one ejector pin moves within the spill cavity to eject plastic from the spill cavity and the angled portion of the secondary runner in the extended position of the ejector plate.

11. The ejector pin subsystem of claim 7 wherein the molten plastic flows in a first direction through the vertically extending portion of the secondary runner to reach the at least one spill cavity and wherein the split pin moves in the vertically extending portion of the secondary runner in a second direction substantially opposite the first direction during movement of the ejector plate from its retracted position to its extended position.

\* \* \* \* \*